(12) United States Patent
Nishimura

(10) Patent No.: US 8,641,296 B2
(45) Date of Patent: Feb. 4, 2014

(54) OPTICAL PATH CHANGE MEMBER AND HOLDING MEMBER BODY

(75) Inventor: Akito Nishimura, Sakura (JP)

(73) Assignee: Fujikura Ltd., Tokyo (JP)

( * ) Notice: Subject to any disclaimer, the term of this patent is extended or adjusted under 35 U.S.C. 154(b) by 239 days.

(21) Appl. No.: 12/878,565

(22) Filed: Sep. 9, 2010

(65) Prior Publication Data
US 2011/0064358 A1    Mar. 17, 2011

(30) Foreign Application Priority Data

Sep. 11, 2009    (JP) .................................. 2009-210376

(51) Int. Cl.
*G02B 6/36*    (2006.01)

(52) U.S. Cl.
USPC ................... 385/92; 385/89; 385/93; 385/31; 385/33

(58) Field of Classification Search
None
See application file for complete search history.

(56) References Cited

U.S. PATENT DOCUMENTS

| | | | | |
|---|---|---|---|---|
| 5,742,720 A | * | 4/1998 | Kobayashi et al. .............. | 385/89 |
| 5,901,262 A | | 5/1999 | Kobayashi et al. | |
| 6,491,447 B2 | * | 12/2002 | Aihara ............................ | 385/92 |
| 6,554,493 B2 | * | 4/2003 | Melchior et al. ................. | 385/89 |
| 7,220,065 B2 | * | 5/2007 | Han et al. ......................... | 385/89 |
| 7,404,679 B2 | * | 7/2008 | Ebbutt et al. ..................... | 385/78 |
| 2004/0114866 A1 | * | 6/2004 | Hiramatsu ....................... | 385/39 |

FOREIGN PATENT DOCUMENTS

| | | |
|---|---|---|
| CN | 1523391 A | 8/2004 |
| CN | 1820215 A | 8/2006 |
| JP | 2001-51162 A | 2/2001 |
| JP | 2006-184680 A | 7/2006 |
| JP | 2006-184782 A | 7/2006 |
| JP | 2007-121973 A | 5/2007 |
| JP | 2009-134262 A | 6/2009 |
| KR | 10-2006-00054914 A | 5/2006 |

OTHER PUBLICATIONS

Japanese Office Action for Japanese Application No. 2009-210376 dated Oct. 30, 2012.
Office Action issued by the Chinese Patent Office in Chinese Application No. 201010276937.3 dated Aug. 1, 2012.

* cited by examiner

*Primary Examiner* — Hemang Sanghavi
(74) *Attorney, Agent, or Firm* — Sughrue Mion, PLLC

(57) ABSTRACT

Provided is an optical path change member including a holding member body formed of a transparent material. The holding member body includes: at least two rows of optical-fiber insertion holes which hold optical fibers inserted therein, such that the optical axes of the optical fibers are inclined with respect to an optical axis of the optical device, and a reflective inner surface which totally internally reflects light incident from the optical-fiber insertion holes to a surface of the holding member body configured to face an optical device on a board.

15 Claims, 4 Drawing Sheets

OPTICAL PATH CHANGE MEMBER AND HOLDING MEMBER BODY

BACKGROUND OF THE INVENTION

1. Field of the Invention

The present invention relates to an optical path change member provided at a terminal of a light transmission medium such as an optical fiber, and a holding member body used for the optical path change member. The optical path change member is an optical part for, changing an optical path direction between an optical fiber and a light input and output end provided on a board to optically connect the optical fiber with the light input and output end.

Priority is claimed on Japanese Patent Application No. 2009-210376 filed on. Sep. 11, 2009, the disclosure of which is incorporated herein by reference.

2. Description of the Related Art

In recent years, a scheme of fixing an optical connector assembled with a front end portion of an optical fiber arranged along aboard, on the board to be optically connected to an optical device mounted on the board, such as a light-emitting device such as a vertical cavity surface emitting laser (hereinafter, referred to as a VCSEL) or a light-receiving device such as a photodiode (PD), from or to which light is output or input vertically to the board, has been widely used.

A structure for changing an optical path to optically connect the optical fiber with the optical device is provided in such an optical connector. As a representative optical connector having this structure, a photonic turn, optical connector (a PT optical connector) for changing an optical axis by 90° inside the connector (standardized in JPCA-PE03-01-06S) is available.

The PT optical connector is a board-mounted optical connector for optically connecting a multi-core optical fiber, such as a multi-core optical fiber ribbon, with an optical device on a flexible wiring board. The PT optical connector has begun to be used for optical interconnection of a router, a server, a parallel computer and the like.

An optical path change member for changing an optical path direction of a multi-core optical fiber is disclosed in Japanese Unexamined Patent Application, First Publication No. 2006-184782. The optical path change member changes an optical path of two-dimensionally arranged multi-core optical fibers. In the optical path change member, the multi-core optical fibers in an upper row are inclined with respect to the multi-core optical fibers in a lower row, and front ends of the optical fibers in the upper and lower rows are closer. This prevents a great optical path difference. The optical path change member is of an outer-surface reflection type in which light output from the optical fiber or an optical device collides with a reflective surface from the outside of an optical path change member body.

An optical module is used as the optical device connected with the multi-core optical fiber. This optical module is an optical part including a multi-channel light-emitting device, a multi-channel light-receiving device, and a transmitting and receiving circuit.

An inner-surface reflection type of a PT optical connector in which light from the inside of an optical path change member body collides with a reflective surface through the inside of the optical path change member body is disclosed as an optical path change member in Japanese Unexamined Patent Application, First Publication No 2007-121973. A lens is formed on a lower surface of the optical path change member. Light output from a front end of an optical fiber is totally reflected toward a circuit board by the reflective surface, focused by the lens, and optically connected with a light input and output end of the circuit board. When the optical device of the circuit board is a light-emitting device, light output from the light-emitting device is focused by the lens, totally reflected by the reflective surface, and optically connected with the front end of the optical fiber.

A PT optical connector in which multi-core optical fibers are two-dimensionally arranged is disclosed in Japanese Unexamined Patent Application, First Publication No. 2006-184680. In the optical path change member, the optical fiber hole arrays corresponding to the multi-core optical fibers are shifted from each other. As the optical fiber hole arrays are arranged to be shifted from each other, light interference can be prevented.

However, the reflective surface in the conventional optical path change member is an inclined flat surface. Accordingly, it is difficult to change an optical path of incident light in an optimal direction. If the reflective surface is the flat inclined surface, optical connection may not be maintained when the direction of the incident light is shifted. In particular, if the multi-core optical fibers are two-dimensionally arranged, it is difficult to position the multi-core optical fiber and the optical device with respect to each other.

The present invention has been achieved in view of the above circumstances, and it is an object of the present invention to provide an optical path change member for allowing an optical path to be accurately changed on a reflective surface even when multi-core optical fibers are two-dimensionally arranged, and a holding member body used for the optical path change member.

SUMMARY OF THE INVENTION

In order to achieve the object, the invention has employed the followings.

(1) An optical path change member according to an aspect of the present invention includes: a holding member body formed of a transparent material, the holding member body includes: at least two rows of optical-fiber insertion holes which hold optical fibers inserted therein, such that the optical axes of the optical fibers are inclined with respect to an optical axis of the optical device, and a reflective inner surface which totally internally reflects light incident from the optical-fiber insertion holes to a surface of the holding member body configured to face an optical device on a board.

According to the optical path change member described in (1), the optical path is accurately changed on the reflective surface even when the multi-core optical fibers are two-dimensionally arranged.

(2) It is may be arranged such that in the optical path change member described in (1), the holding member body further includes an array of first lenses formed on the reflective inner surface, wherein each of the first lenses is concave when viewed from an incident direction of light and is aligned with one of the optical-fiber insertion holes.

In the case of (2), light incident to the reflective surface can be focused by the first lenses in the concave shape. Accordingly, the optical path direction can be accurately changed (3) It may be arranged such that in the optical path change member described in (1) or (2), positions of the optical-fiber insertion holes in the optical-fiber insertion hole arrays are shifted from each other between adjacent rows.

In the case of (3), an interval between the end faces of the optical fibers positioned by the optical-fiber insertion holes is broadened and interference of noise or signal light due to beam spread to the optical paths of the adjacent optical fibers is prevented, thus realizing an excellent optical connection.

(4) It may be arranged such that in the optical path change member described in any one of (1) to (3), second lenses are provided between the reflective surface and the light input and output ends, and at least two lenses are provided on an optical path between the multi-core optical fiber and the light input and output end.

In the case of (4), even when the direction of the incident light between the reflective surface and the light input and output end is shifted, the optical path can be maintained in a desired direction by the second lenses.

(5) It may be arranged such that in the optical path change member described in any one of (1) to (4), the holding member body further includes a positioning convex portion which protrudes therefrom.

In the case of (5), the multi-core optical fiber arranged to face the reflective surface is correctly positioned with respect to the light input and output ends.

(6) It may be arranged such that in the optical path change member described in (5), the positioning convex portion is a positioning pin.

(7) It may be arranged such that in the optical path change member described in (6), the positioning pin protrudes from the surface of the holding member body configured to face an optical device and is integrally molded with the holding member body.

(8) A holding member body for an optical path change member according to another aspect of the present invention is a holding member body for an optical path change member, the holding member body including: at least two rows of optical-fiber insertion holes which hold optical fibers inserted therein, a reflective inner surface which totally internally reflects light incident from the optical-fiber insertion holes to a surface of, the holding member body configured to face an optical device on a board.

(9) It may be arranged such that in the holding member body for an optical path change member described in (8), the holding member body further includes an array of first lenses formed on the reflective inner surface, wherein each of the first lenses is concave when viewed from an incident direction of light and is aligned with one of the optical-fiber insertion holes.

(10) It may be arranged such that in the holding member body for an optical path change member described in (8) or (9), positions of the optical-fiber insertion holes in the optical-fiber insertion hole arrays are shifted from each other between adjacent rows.

(11) It may be arranged such that in the holding member body for an optical path change member described in any one of (8) to (10), the holding member further includes a positioning convex portion which protrudes therefrom.

(12) It may be arranged such that in the holding member body for an optical path change member described in (11), the positioning convex portion is a positioning pin.

(13) It may be arranged such that in the holding member body for an optical path change member described in (12), the positioning pin protrudes from the surface of the holding member body configured to face an optical device and is integrally molded with the holding member body.

DETAILED DESCRIPTION OF THE INVENTION

First Embodiment

Hereinafter, a first embodiment of the present invention will be described in detail with reference to the accompanying drawings.

Figure 1:
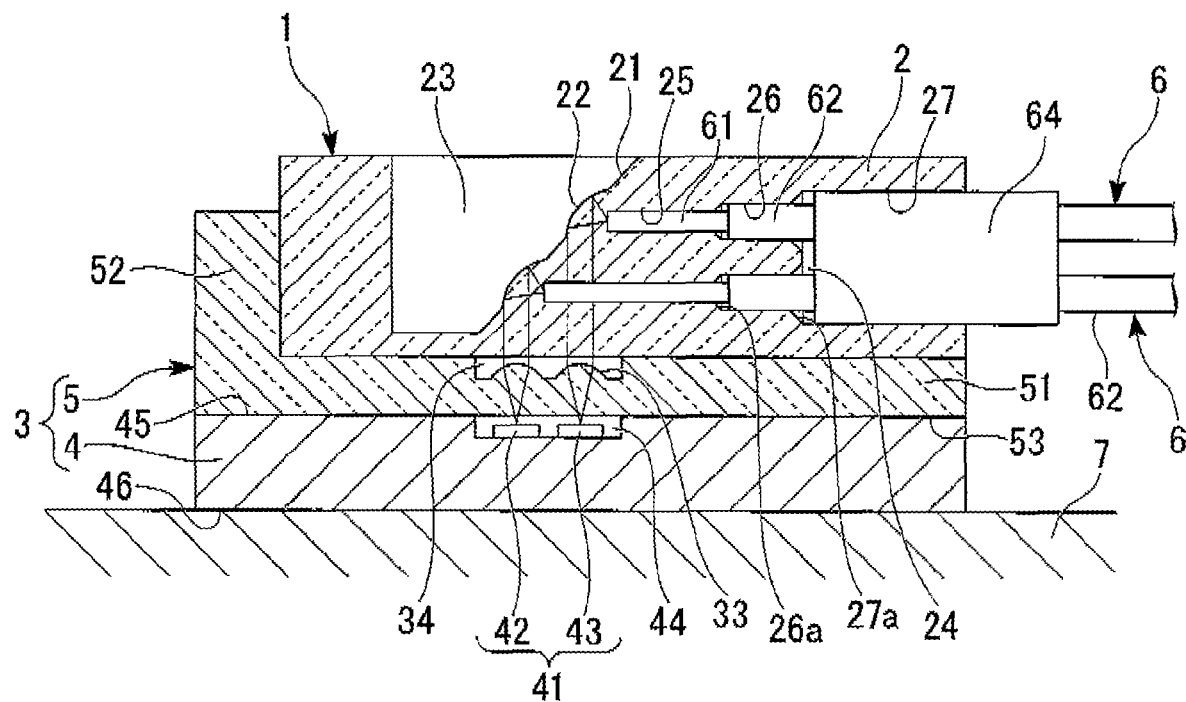
FIG. 1 is a cross-sectional view of an optical path change member according to a first embodiment of the present invention.
Figure 2:
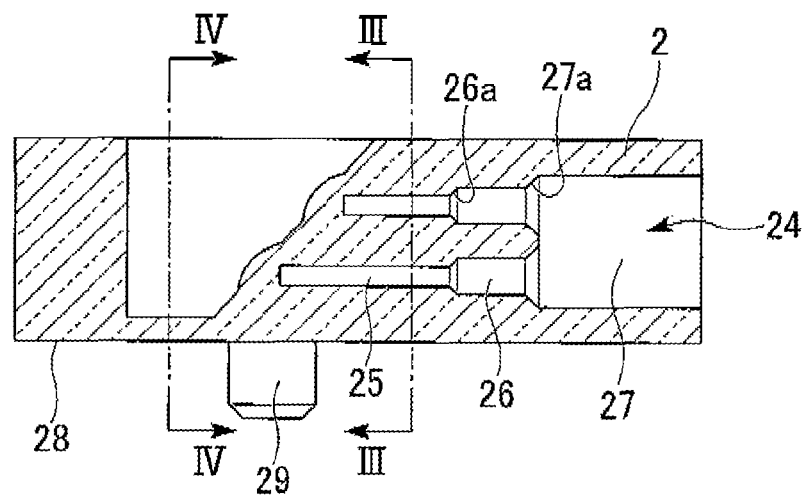
FIG. 2 is a cross-sectional view of a holding member body constituting the optical path change member.
Figure 3:
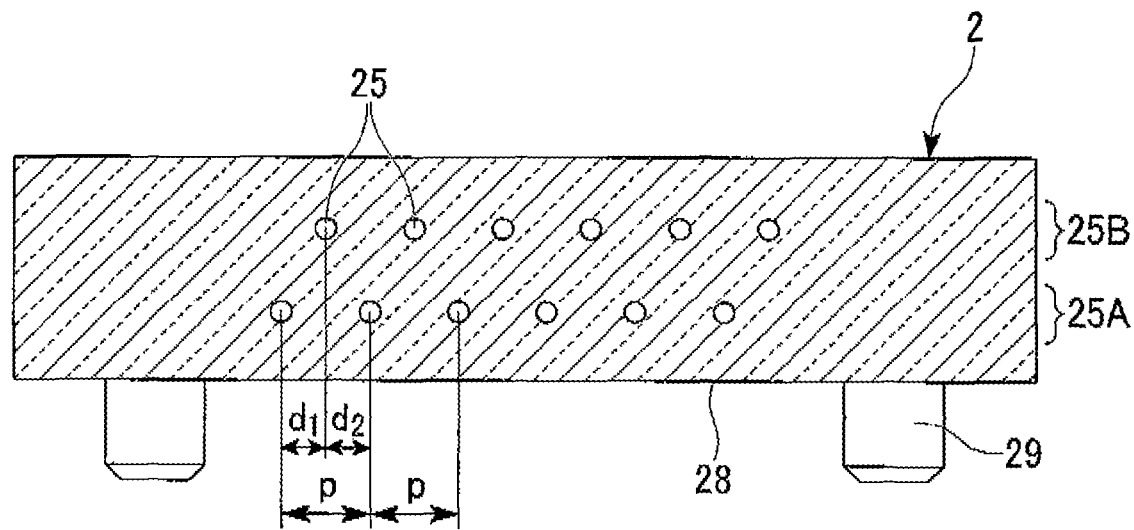
FIG. 3 is a cross-sectional view of the holding member body taken along a line III-III in FIG. 2.
Figure 4:
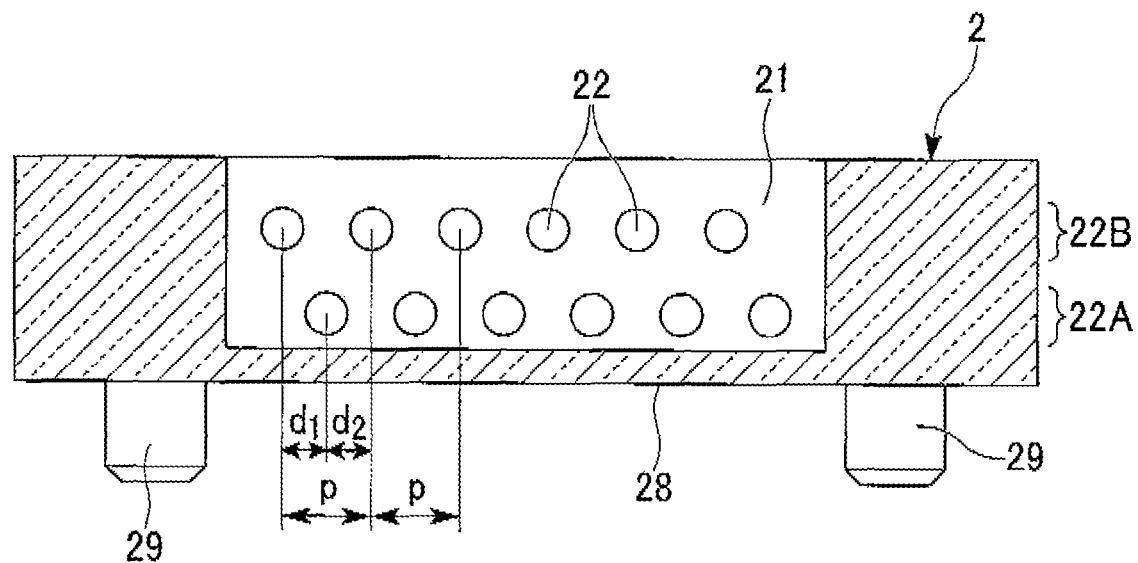
FIG. 4 is a cross-sectional view of the holding member body taken along a line IV-IV in FIG. 2.
Figure 5:
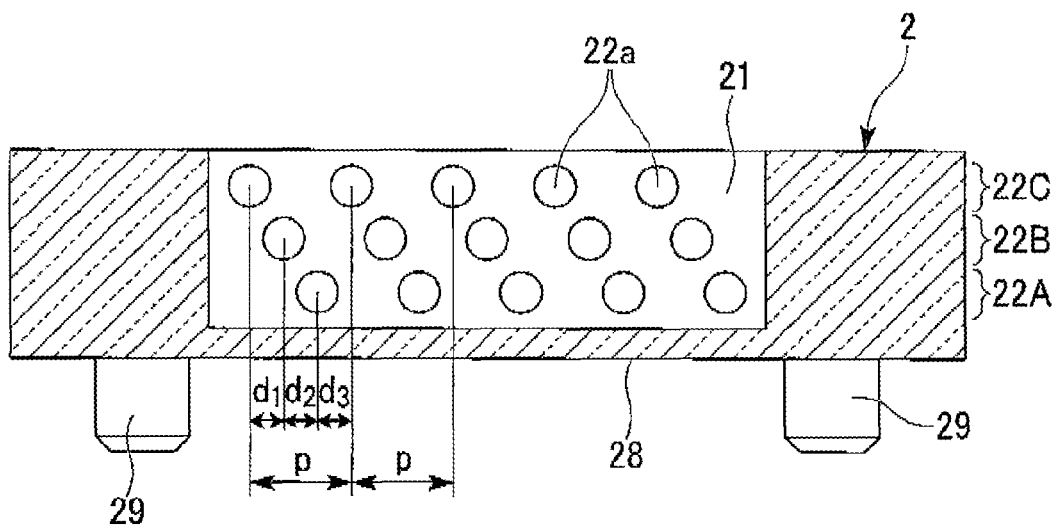
FIG. 5 is a cross-sectional view of a holding member body taken along a line IV-IV according to a second embodiment of the present invention.
Figure 6:
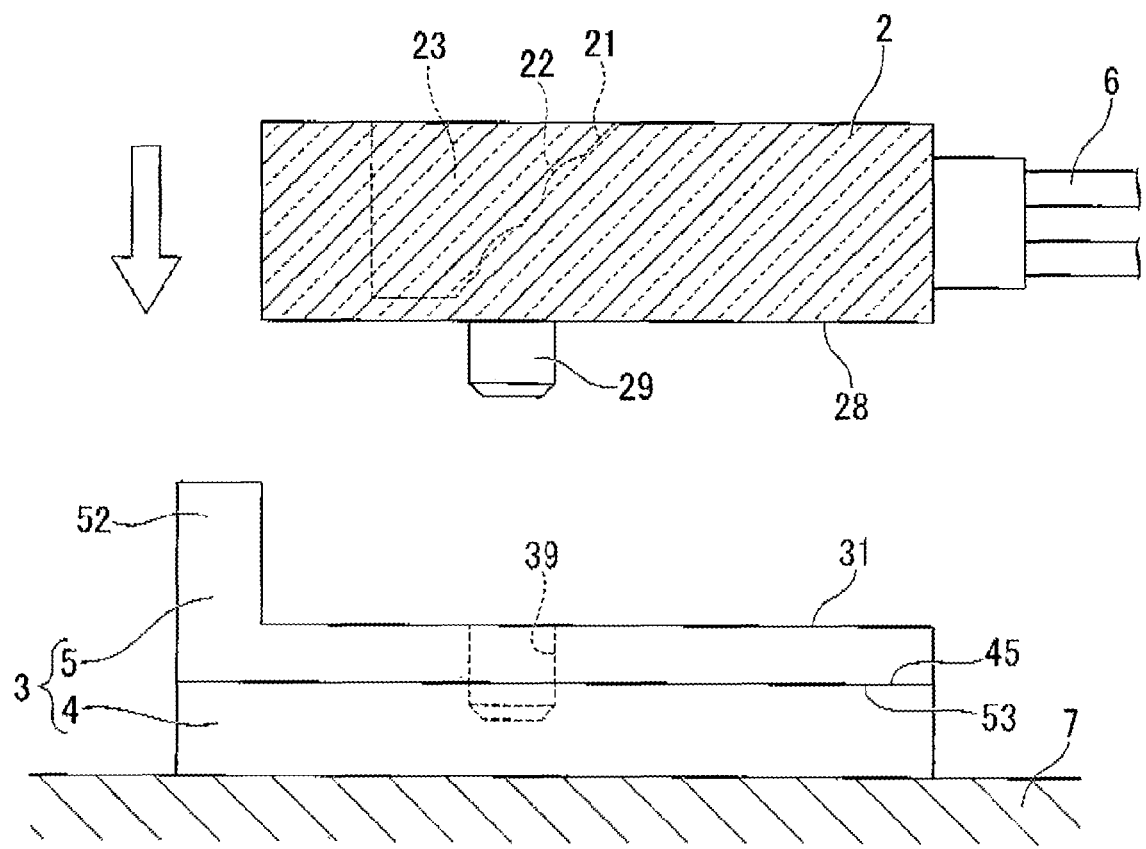
FIG. 6 is a schematic view showing attachment of the holding member body to an optical module.

FIG. 1 is a cross-sectional view of an optical path change member 1 according to the first embodiment of the present invention. As shown in FIG. 1, a holding member body 2 provided at terminals of multi-core optical fibers 6 arranged in two rows is attached to an optical module 3 (board) having a light-emitting device 42 and a light-receiving device 43 mounted thereon. FIG. 2 is a cross-sectional view showing the holding member body 2 constituting the optical path change member 1 according to the first embodiment of the present invention. FIG. 3 is a cross-sectional view of the holding member body 2 taken along a line III-III in FIG. 2. FIG. 4 is a cross-sectional view of the holding member body 2 taken along a line IV-IV in FIG. 2. In FIG. 4, an arrangement of first lenses 22 formed on a reflective surface 21 provided in the optical path change member 1 is shown. FIG. 5 is a cross-sectional view of a holding member body taken along a line IV-IV according to a second embodiment of the present invention. FIG. 6 is a schematic view showing an attachment of the holding member body 2 to the optical module 3.

Hereinafter, a front end direction of the multi-core optical fiber 6 (a left direction in FIG. 1) may also be referred to as a front side and a reverse direction (a right direction in FIG. 1) may also be referred to as a rear side. A longitudinal direction is an optical axis direction of the multi-core optical fiber 6.

As shown in FIG. 1, the holding member body 2 includes the optical path change member 1 and is provided at the terminals of the multi-core optical fibers 6. The holding member body 2 is attached to the optical module 3 assembled on a circuit board 7, such that the light input and output end 41 of a light-emitting device 42 and a light-receiving device 43 are optically connected with the multi-core optical fibers 6. First lenses 22 for focusing light are formed on the reflective surface 21.

In general, the multi-core optical fiber 6 is called a multi-core optical fiber ribbon. The multi-core optical fiber 6 is a set of a plurality of optical fibers 61 collected by a tape coating (a second coating). In the present embodiment, the multi-core optical fibers 6 are arranged in two rows. A cylindrical boot 64 of, for example, flexible rubber is attached on the periphery of the multi-core optical fibers 6 arranged in the two rows. The boot 64 collectively holds the multi-core optical fibers 6 configured in the two rows. Accordingly, the multi-core optical fibers 6 are prevented from scattering. The boot 64 performs a function of protecting the multi-core optical fibers 6 so that the multi-core optical fibers 6 are not subjected to sharp bending that affects an optical transmission characteristic.

The multi-core optical fiber 6 is not limited to a multi-core optical fiber ribbon. For example, various structures such as a plurality of single-core optical fibers may be employed.

Next, the optical module 3 will be described.

The optical module 3 is assembled on the circuit board 7. The optical module 3 has a function of driving the light-emitting device 42 (a light input and output end 41) based on a control signal from a driving circuit on the circuit board 7, or a function of delivering an electrical signal corresponding to a light signal received by the light-receiving device 43 (the light input and output end 41) to a processing circuit on the circuit board 7. Alternatively, the optical module 3 has both of the above-described functions.

The optical module 3 includes an optical module body 4 having the light input and output end 41 mounted thereon (or embedded therein), and a lens holder 5. The lens holder 5 is mounted on an upper surface of the optical module body 4 which is directly disposed on the circuit board 7. The lens holder 5 has the same shape as the optical module body 4 when viewed from the top. In the example shown, the optical module 3 is formed in a block shape. The upper surface of the optical module 3 is a bonding surface 31 on which the holding member body 2 is mounted.

The optical module body 4 constituting a lower portion of the optical module 3 is a member in a block shape directly attached to the circuit board 7. The optical module body 4 includes an upper surface 45 connected with the lens holder 5 and a lower surface 46 connected with the circuit board 7.

A first concave portion 44 is formed on the upper surface 45 of the optical module. The light input and output end 41 of the light-emitting device 42 and the light-receiving device 43 is mounted in the first concave portion 44. The light input and output ends 41 are provided in a plurality of rows in a lateral direction of the optical module 3 to correspond to the arrangement of the optical fibers 61 constituting the multi-core optical fibers 6. The arrangement of the light input and output ends 41 depends on the arrangement of the multi-core optical fibers 6 and the first lenses 22, and the arrangement will be described later.

The light input and output end 41 includes the light-emitting device such as a VCSEL or the light-receiving device such as a photodiode (PD). In the present embodiment, for example, among the light input and output ends 41 provided in two rows in the longitudinal direction, the light-emitting devices 42 are provided in a row at a front side and the light-receiving devices 43 are provided in a row at a rear side.

An optical axis direction of the light input and output end 41 of the optical module body 4 is substantially vertical to the circuit board 7 (see FIG. 1). The optical axis direction of the light input and output end 41 may be inclined at an angle other than 90° with respect to the circuit board 7.

The lens holder 5 having substantially the same shape as the optical module body 4 when viewed from the top is provided on the upper surface 45 of the optical module body 4. The lens holder 5 is formed integrally with the optical module body 4 using a given method. The lens holder 5 is formed of a transparent material. Second lenses 33 are formed on an upper surface of the lens holder 5 using integral molding. The second lens 33 is a spherical or aspherical convex lens that is convex upward. Examples of a preferred material of the lens holder 5 include polycarbonate (PC), ZEONEX (amorphous cycloolefin polymer: registered trademark), ULTEMNATURAL (polyetherimide: registered trademark), polymethyl methacrylate (PMMA), modified polyolefin, polyphenylsulfone (PPSU), and epoxy resin.

The second lens 33 is formed in a second concave portion 34 provided on the upper surface 53 of the lens holder 5 not to interfere with the optical path change member 1 when the optical path change member 1 is attached. The second lenses 33 are provided in a plurality of rows to correspond to the arrangement of the optical fibers 61 constituting the multi-core optical fibers 6, similar to the light input and output ends 41. The second lenses 33 are disposed on extensions of the optical axes of the light input and output ends 41. This arrangement will be described later.

The guide portion 52 is formed at the front of the lens holder 5 and functions as an alignment member when the holding member body 2 is attached to the optical module 3. At a front portion of the lens holder 5, the guide portion 52 is fanned in a vertical direction, and the lens holder base portion 51 and the guide portion 52 are integrally formed in an L-figured shape.

A photoelectric conversion circuit, a control processing unit, an optical signal processing circuit, an optical device driving circuit, and various circuits for driving and controlling electronic parts on the circuit board are provided on the circuit board 7 having the optical module 3 mounted thereon, although not shown.

Next, the holding member body 2 will be described.

The holding member body 2 is assembled to cover the front ends of the multi-core optical fibers 6. The holding member body 2 optically connects the multi-core optical fibers 6 with the light input and output ends 41. As described above, the optical axes of the multi-core optical fibers 6 are inclined with respect to the optical axes of the light input and output end 41. Accordingly, an optical path is changed by the reflective surface 21 in the holding member body 2, such that the optical connection is performed.

The holding member body 2 is formed of a transparent material, and is a member in a block shape having the reflective surface 21 and the optical-fiber insertion holes 24 formed therein. Examples of a preferred material of the holding member body 2 include polycarbonate (PC), ZEONEX (amorphous cycloolefin polymer: registered trademark), ULTEM-NATURAL (polyetherimide: registered trademark), PMMA, modified polyolefin, PPSU, and epoxy resin A reflective-surface-formed concave portion 23 is formed on the upper surface of the holding member body 2. The reflective-surface-formed concave portion 23 has a groove shape extending in a lateral direction of the holding member body 2. The reflective-surface-formed concave portion 23 has a cross-section in the shape of a trapezoid of which the width is gradually reduced in a depth direction.

Among inner surfaces of the reflective-surface-formed concave portion 23, a rear surface 23*a* (at the multi-core optical fiber 6 side) is an inclined surface. This inclined surface is the reflective surface 21. The reflective surface 21 is positioned on extensions of the optical axes of the multi-core optical fibers 6, and is located above the light input and output ends 41 when the holding member body 2 is fixed on the optical module 3.

The reflective surface 21 is formed to be inclined with respect to the optical axis direction of the multi-core optical fiber 6 (a horizontal direction in FIG. 1) and the optical axis direction of the light input and output end 41 (a vertical direction in FIG. 1). The reflective surface 21 inner-surface-reflects, inside the holding member body 2, light from the multi-core optical fiber 6 incident to the holding member body 2, toward the light input and output end 41. Alternatively, the reflective surface 21 inner-surface-reflects, inside the holding portion body 2, light from the light input and output end 41 incident to the holding member body 2, toward the front end of the multi-core optical fiber 6.

The reflective surface 21 optically connects the multi-core optical fiber 6 with the light input and output end 41 by the inner-surface-reflection inside the holding member body 2. This inner-surface-reflection is based on a refractive index difference between the material of the holding member body 2 and air (the reflective-surface-formed concave portion 23). A higher efficiency of the reflection on the reflective surface 21 is preferable. The reflective-surface-formed concave portion 23 may be applied with another gas and sealed, as long as an appropriate refractive index difference between the gas in the reflective-surface-formed concave portion 23 and the material of the holding member body 2 is satisfied.

The first lenses 22 corresponding in number to the optical fibers 61 constituting the multi-core optical fiber 6 are formed on the reflective surface 21. The first lens 22 is a spherical lens or aspherical lens having a concave shape when viewed from the multi-core optical fiber and the light input and output end 41 (in other words, when viewed from an incident direction of light). A curvature of the first lens 22 is designed so that the end face of the optical fiber 61 is positioned at a focusing point of the reflected light. The first lens 22 is formed so that a center of the first lens 22 is positioned on the reflective surface 21 and on an extension of the optical axis of the optical fiber 61 and an extension of the optical axis of the light input and output end 41. Accordingly, the arrangement of the first lenses 22 depends on the arrangement of the optical fibers 61. The arrangement of the optical fibers 61 (the multi-core optical fibers 6) will be described later.

The multi-core optical-fiber insertion hole 24 is formed in a longitudinal direction in a rear portion of the holding member body 2. The multi-core optical-fiber insertion hole 24 has a rear end opened at a rear surface 2a of the holding member body 2.

The multi-core optical-fiber insertion hole 24 is subjected to a termination process, and has such a shape that the multi-core optical fibers 6 jacketed with a boot 64 can be tightly held. Specifically, the multi-core optical-fiber insertion hole 24 includes optical-fiber insertion holes 25 into which the optical fibers 61 of the multi-core optical fibers 6 are inserted, a multi-core optical fiber holding portion 26 corresponding to an outer diameter of the tape coating covering the optical fiber 61, and a boot insertion portion 27 corresponding to the boot 64 holding the multi-core optical fibers 6. The optical fiber insertion portions 25 are formed to correspond in number to the optical fibers 61.

A first tapered portion 26a serving as a guide when the optical fiber 61 is inserted into the optical-fiber insertion hole 25 is formed between the optical-fiber insertion hole 25 and the multi-core optical fiber holding portion 26. Similarly, a second tapered portion 27a is formed between the multi-core optical fiber holding portion 26 and the boot insertion portion 27.

The optical-fiber insertion hole 25 is machined to a depth for positioning the front end of the optical fiber 6 and the first lens 22 to a predefined position. In other words, each optical-fiber insertion hole 25 is formed so that the front end of the optical fiber 61 is consistent with a focusing point of the first lens 22 when the multi-core optical fiber 6 is inserted so that the front end of the optical fiber 61 contacts a bottom portion 25c of the optical-fiber insertion hole 25.

A housing (not shown) for preventing light from entering the holding member body 2 may be provided around the holding member body 2.

As shown in FIGS. 2 to 6, the holding member body 2 includes two positioning pins 29 (positioning convex portions) protruded from the mounting surface 28. The positioning pins 29 are disposed substantially at a center in the longitudinal direction of the holding member body 2 not to interfere with the optical path. The positioning pin 29 has a cylindrical shape. The positioning pins 29 are formed integrally with the holding member body 2 using integral molding, and has a tapered portion 29a provided at a front end thereof.

As shown in FIG. 6, positioning pin holes 39 (positioning concave portions) are formed on the bonding surface 31 of the optical module 3 contacting the holding member body 2. Each positioning pin hole 39 has a shape designed to correspond to the shape of the positioning pin 29 so that the positioning pin 29 is accurately positioned. In the present embodiment, the positioning pin hole 39 is a round hole into which the positioning pin 29 formed as a round bar is fitted.

The present invention is not particularly limited to this example, and the positioning pin 29 may be provided as a separate member, instead of being integrally molded with the holding member body 2. For example, a mounting hole may be provided in the holding member body 2 and a round bar pin of stainless steel may be inserted into the mounting hole. Alternatively, a positioning pin may protrude from the optical module 3, a positioning pin hole may be formed in the holding member body 2, and the positioning pin may be fitted into the positioning pin hole.

The number of the positioning pins 29 is not particularly limited, but the number may be 1, 2, 3 or greater depending on, for example, purposes. The shapes of the positioning pin 29 and the positioning pin hole 39 are not particularly limited. The positioning pin 29 and the positioning pin hole 39 may have any shape, including an oval and a square, depending on, for example, purposes.

As shown in FIGS. 3 and 4, the optical-fiber insertion holes 25 and the first lenses 22 are arranged two-dimensionally to form a plurality of rows. In the case of the optical-fiber insertion holes 25, a plurality of rows 25A and 25B in which a plurality of optical-fiber insertion holes 25 are arranged side by side are disposed in a thickness direction of the holding member body 2. Similarly, in the case of the first lenses 22, a plurality of rows 22A and 22B in which a plurality of first lenses 22 are arranged in the lateral direction of the holding portion body 2 are disposed in the thickness direction of the holding member body 2.

In the holding member body 2 of the first embodiment, the optical-fiber insertion holes 25 and the first lenses 22 are arranged in the two rows to correspond to the multi-core optical fibers 6 configured in two rows, as shown in FIGS. 3 and 4. For convenience, in the following description of the holding member body 2 of the first embodiment, the rows 25A, 25B, 22A and 22B are indicated as first rows 25A and 22A (at a lower side in FIGS. 3 and 4) and second rows 25B and 22B (at an upper side in FIGS. 3 and 4) in order of a smaller distance from the mounting surface 28.

Next, detailed arrangements of the optical-fiber insertion holes 25 and the first lenses 22 will be described. The optical-fiber insertion holes 25 and the first lenses 22 are at the same position when viewed from the optical axis direction. Accordingly, the arrangement will be described herein with reference to the positions of the optical-fiber insertion holes 25.

As shown in FIG. 3, the optical-fiber insertion holes 25 are arranged in the two rows 25A and 25B. In each row 25A or 25B, a plurality of optical-fiber insertion holes 25 are laterally arranged and are arranged at regular intervals of pitches p. Accordingly, a plurality of optical fibers 61 of each multi-core optical fiber 6 can be collectively inserted and assembled into the holding member body 2. It is preferable that the pitch p between the centers of the optical-fiber insertion, holes 25 belonging to the same row 25A or 25B and adjacent to each other corresponds to a pitch of the optical fiber 61 in the ribbon. Accordingly, the respective optical fibers 61 can be aligned in parallel and disadvantages such as loss increase due to bending of the optical fibers 61 can be suppressed.

Further, the positions of the optical-fiber insertion holes 25 are shifted from each other in the lateral direction of the holding member body 2 (a horizontal direction in FIG. 3) between the first rows 25A and the second rows 25B.

Here, a size d (d1, d2) of the shift of the optical-fiber insertion holes 25 secured between the first row 25A and the second row 25B is greater than a beam diameter of the optical path so that the optical paths do not overlap. Since the beam diameter of the optical path is slightly greater than a core diameter of the optical fiber 61 in consideration of beam spread, the shift amount d (d1, d2) is set to a value slightly greater than the core diameter. As long as this condition is satisfied, the shift amount d1 between the optical-fiber insertion hole $25a_1$ of the first row 25A and the optical-fiber insertion hole 25b of the second row 25B may be equal to or different from the shift amount d2 between the optical-fiber insertion hole 25b of the second row 25B and the optical-fiber insertion hole $25a_2$ of the first row 25A.

As described above, the optical-fiber insertion holes 25 and the first lenses 22 are at the same position when viewed from the optical axis direction. Accordingly, the arrangement of the first lenses 22 is as shown in FIG. 4. That is, a pitch p between centers of the first lenses 22 and a shift size d between the first lenses 22 are the same as those of the optical-fiber insertion holes 25.

The second lenses 33 of the optical module 3, and the light-emitting device and the light-receiving device constituting the light input and output end 41 are disposed at positions consistent with the positions of the first lenses 25 in plane view of these. The second lenses 33 and the light input and output ends 41 are arranged two-dimensionally to form a plurality of rows. Pitches and shift sizes of the second lenses 33 and the light input and output ends 41 are the same as those of the optical-fiber insertion holes 25 and the first lenses 25.

When the holding member body 2 of the present embodiment is assembled with the front end of the multi-core optical fiber 6, a coating is removed from the front end portion of the multi-core optical fiber 6 to expose the individual optical fibers 61. The multi-core optical fiber 6 is then inserted from the rear of the holding member body 2. In this case, the multi-core optical fiber 6 is then inserted so that the front end of the optical fiber 61 contacts the bottom portion 250 of the optical-fiber insertion hole 25, such that the front end of the optical fiber 61 and first lens 25 are positioned. The multi-core optical fiber 6 is bonded to the holding member body 2 using, for example, adhesive.

When the multi-core optical fiber 6 assembled into the holding member body 2 is optically connected to the light input and output end 41 mounted on the optical module 3, the mounting surface 28 of the first holding member body 2 is caused to oppose the bonding surface 31 of the optical module 3, as shown in FIG. 6. The positioning pins 29 protruding from the mounting surface 28 of the holding member body 2 are then inserted into the positioning pin holes 39 formed in the bonding surface 31 of the optical module 3, such that the holding member body 2 is engaged with the optical module 3. In this case, the front end of the holding member body 2 is brought into contact with the guide portion 52 of the lens holder 5, such that the positioning can be easily performed. Accordingly, the multi-core optical fiber 6 arranged to face the reflective surface 21 is correctly positioned with respect to the light input and output end 41, and the multi-core optical fiber 6 is optically connected to the light-emitting device 42 or the light-receiving device 43 through the reflective surface 21.

The first lenses 22 and the second lenses 33 are provided on the optical path between the multi-core optical fiber 6 and the light input and output end 41. Accordingly, light output from the multi-core optical fiber 6 is reflected by the first lens 22 to be a light beam vertical to the optical axis direction of the multi-core optical fiber 6, and the light beam is focused by the second lens 33 and incident to the light-receiving device 43. Alternatively, light output from the light-emitting device 42 is converted to be a light beam parallel to the optical axis of the light input and output end 41 through the second lens 33, and the light beam is reflected and focused by the first lens 22 and incident to the front end of the optical fiber 61.

The optical path change member 1 of the present embodiment has the first lenses 22 having a lens shape provided on the reflective surface 21, such that the optical path can be maintained in a desired direction even when the direction of the incident light is shifted.

Further, the optical-fiber insertion hole 25 for precisely positioning the multi-core optical fibers 6 and the reflective surface 21 are formed in the holding member body 2, which is an integral part and has a block shape, and a position relationship between the optical axis direction of the optical fiber 61 and the reflective surface 21 is accurately fixed. Accordingly, each optical fiber 61 and each light input and output end 41 precisely correspond to each other.

Accordingly, even when the multi-core optical fibers 6 are arranged two-dimensionally, the optical path is accurately changed on the reflective surface 21. Further, an overall structure of an optical connector can be miniaturized.

The multi-core optical fibers 6 arranged in a plurality of rows realize a much higher density than a plurality of optical fibers aligned in a row.

As shown in FIG. 3, the arrangement of the optical-fiber insertion holes 25 is a staggered arrangement in which a plurality of rows 25A and 25B of a plurality of optical-fiber insertion holes 25 arranged side by side are fowled and the positions of the optical-fiber insertion holes 25 are shifted from each other between the first row 25A and the second row 25B. Accordingly, an interval between the end faces of the optical fibers 61 positioned by the optical-fiber insertion holes 25 is broadened. Accordingly, interference of noise or signal light due to a beam spread to the optical paths of the adjacent optical fibers 61 is prevented. As a result, it is possible to realize an excellent optical connection.

In the light input and output ends 41 provided in two rows in the longitudinal direction, the light-emitting devices 42 are provided in a row at a front side and the light-receiving devices 43 are provided in a row at a rear side. Therefore, the first row of the two rows of multi-core optical fibers 6 can be used for reception only and the second row can be used for transmission only, thereby obtaining a high-density multi-channel optical transceiver capable of preventing crosstalk.

Further, since the second lenses 33 are provided on the optical path between the first lenses 22 and the light input and output ends 41, it is possible to maintain the optical path in a desired direction even when the direction of the incident light between the first lens 22 and the light input and output end 41 is shifted.

While in the arrangement of the light input and output ends 41 according to the present embodiment, the light-emitting devices 42 in the light input and output ends 41 provided in the two rows in the longitudinal direction are provided in a row at a front side and the light-receiving devices 43 are provided in a row at a rear side, the present invention is not limited thereto. The light-emitting devices 42 and the light-receiving devices 43 may be rearranged depending on specifications.

Second Embodiment

Hereinafter, a second embodiment of the present invention will be described.

While in the embodiment shown in FIGS. 3 and 4, the optical-fiber insertion holes 25 and the first lenses 22 are arranged in two rows, the optical-fiber insertion holes 25 and the first lenses 22 may be arranged in three or more rows according to the present invention.

When the optical-fiber insertion holes 25 are arranged in three or more rows, the positions of the optical-fiber insertion holes 25 are shifted from each other at least between adjacent ones of the rows. Accordingly, an interval between the optical fiber of the upper row and the optical fiber of the lower row is broadened, and thus, interference of noise or signal light can be prevented for an excellent optical connection.

FIG. 5 is a cross-sectional view of the holding member body 2 in which first lenses 22a are arranged in three rows as the multi-core optical fibers 6 are configured in three rows according to the second embodiment. For convenience, in the following description of the second embodiment, the rows are indicated as a first row 22A, a second row 22B, and a third row 22C in order from the shortest to the largest distance from a mounting surface 28.

In the holding member body 2 of the second embodiment shown in FIG. 5, the positions of the first lenses 22a are shifted in a lateral direction of the holding member body 2 (a horizontal direction in FIG. 5), at least, between the first row 22A and the second row 22B and between the second row 22B and the third row 22C. It is preferable that the positions of the first lenses 22a are also shifted from each other in the lateral direction of the holding member body 2 even between the first row 22A and the third row 22C that are not adjacent to each other.

Shift sizes d1, d2 and d3 are greater than beam diameters of optical paths so that the optical paths do not overlap. In FIG. 5, d1 denotes a shift amount between the second row 22B and the third row 22C, d2 denotes a shift amount between the second row 22B and the first row 22A, and d3 denotes a shift amount between the third row 22C and the first row 22A. The shift amounts d1, d2 and d3 may be the same. Alternatively, two of d1, d2 and d3 may be the same or all of them may be different. As shown in FIG. 5, the first lenses 22a belonging to the same row 22A, 22B or 22C and adjacent to each other are arranged at regular intervals so that pitches p between centers of the first lenses 22a are the same. In this case, since a relationship of d1+d2+d3=p is satisfied, the pitch p is intended to secure the shift amounts d1, d2, and d3 between the rows 22A, 22B and 22C. A minimum value of the shift amounts d1, d2 and d3 may be smaller than p/3 as long as the foregoing is satisfied.

When the number of rows of the optical-fiber insertion holes 25 is 4, 5 or, the like, the arrangement of the optical-fiber insertion holes 25 may be determined based on the foregoing.

Third Embodiment

Hereinafter, a third embodiment of the present invention will be described.

Figure 7:
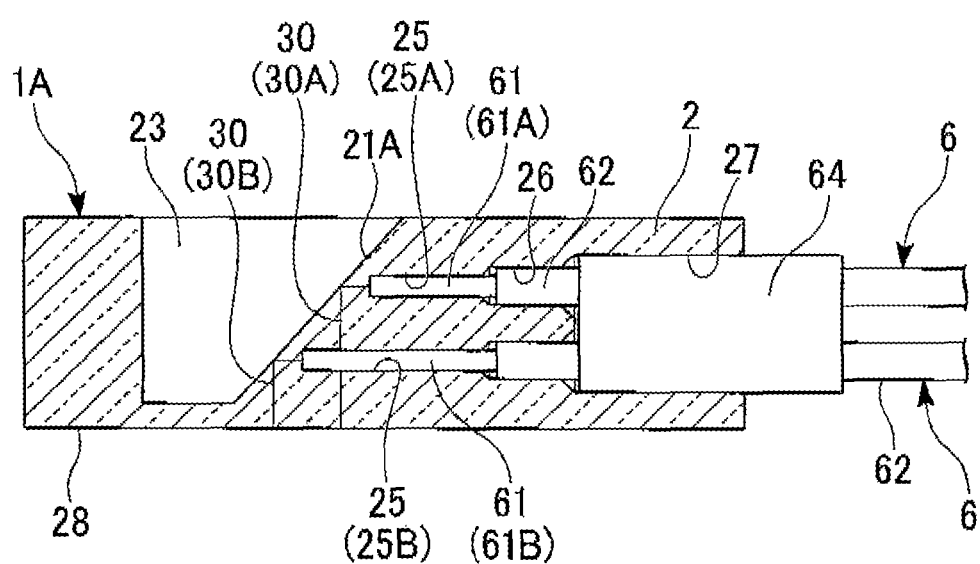
FIG. 7 is a cross-sectional view of an optical path change member according to a third embodiment of the present invention.

FIG. 7 is a cross-sectional view showing an optical path change member 1A in which first lenses are not formed on a reflective surface 21A. The optical path change member 1A has the same configuration as the optical path change member 1 shown in FIG. 1 except that the first lenses are not formed on the reflective surface 21A of a holding member body 2.

The reflective surface 21A is allowed to be formed flat and optically connects multi-core optical fibers 6 with light input and output ends 41 using inner-surface reflection.

It is preferable that since parallelization of light by the first lenses is not performed in the optical path change member 1A, the optical paths 30 of optical fibers 61 have the same length to prevent beam diameters of lights of the optical fibers 61 from being non-uniform. For example, it is preferable that optical paths 30A and 30B of optical fibers 61A and 61B inserted into the optical-fiber insertion holes 25 of different rows 25A and 25B (see FIG. 7) have the same lengths.

Even when the lengths of the optical paths are not the same, there is no problem when light is parallelized by adjusting, for example, profiles of the second lenses of a lens holder. For example, in the example shown in FIG. 7, even though the lengths of the optical paths 30A and 30B of the optical fibers 61A and 61B in the different rows 25A and 25B are not the same, the non-uniformity of the beam diameters is not caused as long as the profiles of the second lenses 33 of the lens holder 5 (e.g., the curvatures of the second lenses 33) (see FIG. 1) are set so that the light can be parallelized.

In the optical path change member 1A, the optical-fiber insertion holes 25 for precisely positioning the two-dimensionally arranged multi-core optical fibers 6, and the reflective surface 21A are formed in the holding member body 2, which is an integral part and has a block shape, similarly with the optical path change member 1 of the first embodiment described above.

Accordingly, a position relationship between the optical axis direction of the optical fiber 61 and the reflective surface 21A is accurately determined and each optical fiber 61 and each light input and output end 41 precisely correspond to each other.

Thus, even when the multi-core optical fibers 6 are two-dimensionally arranged, the optical path is accurately changed on the reflective surface 21A.

Further, since the optical-fiber insertion holes 25 and the reflective surface 21A are formed in the holding member body 2, which is an integral part and has a block shape, the overall structure can be miniaturized.

Since the first lenses are not formed on the reflective surface 21A, the structure of the optical path change member 1A is simple and a structure of a mold for molding the holding member body 2 is simplified. Thus, the optical path change member 1A can be manufactured at a low cost.

While the preferred embodiments of the present invention have been described, the present invention is not limited to the embodiments. Additions, omissions, substitutions, and other variations may be made to the present invention without departing from the scope of the present invention. The present invention is not limited by the above description, but only by the appended claims.

What is claimed is:

1. An optical path change member comprising:
  a holding member body formed of a transparent material, the holding member body comprising:
  at least two rows of optical-fiber insertion holes which hold optical fibers inserted therein, such that the optical axes of the optical fibers are inclined with respect to optical axes of light input and output ends on a circuit board, the optical-fiber insertion holes respectively each having a bottom, wherein front ends of respective optical fibers reach the bottom of respective optical-fiber insertion holes, and a reflective inner surface which totally internally reflects light incident from the optical-fiber insertion holes to a surface of the holding member body facing the light input and output ends, wherein the bottoms of the optical-fiber insertion holes are displaced from each other in an insertion direction of the optical fibers in accordance with an incline of the reflective inner surface as approaching the circuit board.

2. The optical path change member according to claim 1, wherein the holding member body further comprises an array of first lenses formed on the reflective inner surface, wherein each of the first lenses is concave when viewed from an incident direction of light and is aligned with one of the optical-fiber insertion holes.

3. The optical path change member according to claim 2, wherein second lenses are provided between the reflective inner surface and the light input and output ends, and at least two lenses are provided on an optical path between the respective optical fiber and corresponding light input and output ends.

4. The optical path change member according to claim 1, wherein positions of the optical-fiber insertion holes in the optical-fiber insertion hole arrays are shifted from each other between adjacent rows.

5. The optical path change member according to claim 1, wherein the holding member body and the light input and output ends are positioned by fitting of a positioning convex portion provided at a first side into a positioning concave portion provided at a second side.

6. The optical path change member according to claim 5, wherein, the positioning convex portion is a positioning pin and the positioning concave portion is a fitting hole.

7. The optical path change member according to claim 6, wherein the positioning pin protrudes from the surface of the holding member body configured to face the light input and output ends and is integrally molded with the holding member body.

8. The optical path change member according to claim 1, wherein
the reflective inner surface inclines so as to protrude in an insertion direction of the optical fibers as approaching the circuit board.

9. A holding member body for an optical path change member, the holding member body comprising:
at least two rows of optical-fiber insertion holes which hold optical fibers inserted therein, such that optical axes of the optical fibers are inclined with respect to optical axes of input light and output ends on a circuit board, the optical-fiber insertion holes respective each having a bottom, wherein front ends of respective optical fibers reach the bottom of respective optical-fiber insertion holes; and a reflective inner surface which totally internally reflects light incident from the optical-fiber insertion holes to a surface of the holding member body configured to face the light input and output ends, wherein the bottoms of the optical-fiber insertion holes are displaced from each other in an insertion direction of the optical fibers in accordance with an incline of the reflective inner surface as approaching the circuit board.

10. The holding member body according to claim 9,
wherein the holding member body further comprises an array of first lenses formed on the reflective inner surface, wherein each of the first lenses is concave when viewed from an incident direction, of light and is aligned with one of the optical-fiber insertion holes.

11. The holding member body for an optical path change member according to claim 9,
wherein positions of the optical-fiber insertion holes in the optical-fiber insertion hole arrays are shifted from each other between adjacent rows.

12. The holding member body according to claim 9, wherein second lenses are provided between the reflective inner surface and the light input and output ends, and at least two lenses are provided on an optical path between the multi-core optical fiber and the light input and output ends.

13. The holding member body for an optical path change member according to claim 12,
wherein the holding member body further comprises a positioning convex portion which protrudes therefrom.

14. The holding member body for an optical path change member according to claim 13,
wherein the positioning pin protrudes from the surface of the holding member body configured to face the light input and output ends and is integrally molded with the holding member body.

15. The holding member according to claim 9, wherein
the reflective inner surface inclines so as to protrude in an insertion direction of the optical fibers as approaching the circuit board.

* * * * *